US007764386B2

(12) United States Patent
Horita et al.

(10) Patent No.: US 7,764,386 B2
(45) Date of Patent: Jul. 27, 2010

(54) METHOD AND SYSTEM FOR THREE-DIMENSIONAL MEASUREMENT AND METHOD AND DEVICE FOR CONTROLLING MANIPULATOR

(75) Inventors: Shinichi Horita, Osaka (JP); Yoshihisa Abe, Sakai (JP)

(73) Assignee: Konica Minolta Sensing, Inc., Sakai-shi (JP)

(*) Notice: Subject to any disclaimer, the term of this patent is extended or adjusted under 35 U.S.C. 154(b) by 642 days.

(21) Appl. No.: 11/527,283

(22) Filed: Sep. 26, 2006

(65) Prior Publication Data
US 2007/0078624 A1   Apr. 5, 2007

(30) Foreign Application Priority Data
Sep. 30, 2005   (JP) .............................. 2005-288227

(51) Int. Cl.
*G01B 11/24* (2006.01)
(52) U.S. Cl. ........................ 356/601; 356/609; 382/154; 702/2; 702/167; 702/170
(58) Field of Classification Search ......... 356/601–609; 382/52, 154; 702/2, 167–170
See application file for complete search history.

(56) References Cited
U.S. PATENT DOCUMENTS

| 3,888,362 | A | * | 6/1975 | Fletcher et al. | ............. 414/626 |
| 5,612,905 | A | * | 3/1997 | Maillart et al. | .............. 356/602 |
| 6,970,802 | B2 | | 11/2005 | Ban et al. | ................... 702/153 |
| 7,321,841 | B2 | * | 1/2008 | Kaneyasu et al. | ........... 702/167 |

* cited by examiner

*Primary Examiner*—Gregory J Toatley, Jr.
*Assistant Examiner*—Iyabo S Alli
(74) *Attorney, Agent, or Firm*—Sidley Austin LLP

(57) ABSTRACT

A method and system are provided which can easily determine relative positions and postures of a three-dimensional measurement device and an object when the measurement device is used to measure the object using a manipulator. The method includes fixing one of the measurement device and the object, supporting the other at a support point with the manipulator so that a position and support posture of the other can be changed, conducting first measurement with the support point being set to first position and posture, changing the support point to second position and posture so that the second position is a position where the posture is changed, about a reference position within a measurable area of the measurement device in the first measurement, to an opposite side by a degree equal to a portion corresponding to a change from the first posture to the second posture, and conducting second measurement.

8 Claims, 10 Drawing Sheets

METHOD AND SYSTEM FOR THREE-DIMENSIONAL MEASUREMENT AND METHOD AND DEVICE FOR CONTROLLING MANIPULATOR

This application is based on Japanese patent application No. 2005-288227 filed on Sep. 30, 2005, the contents of which are hereby incorporated by reference.

BACKGROUND OF THE INVENTION

1. Field of the Invention

The present invention relates to a three-dimensional measurement method in which a non-contact three-dimensional measurement device such as an optical three-dimensional measurement device is used to conduct measurement of a surface shape of an object and a system for the three-dimensional measurement method. The present invention also relates to a method and device for controlling a manipulator.

2. Description of the Related Art

For the purpose of visual inspection of an object, an optical three-dimensional measurement device for light-section method has been used to conduct measurement of a surface shape (a three-dimensional shape) of the object. At the time of such measurement, any one of the object and the three-dimensional measurement device is fixed and the other is held by a multijoint manipulator, for example, a robot arm. Then, the manipulator is controlled to change relative positions and postures of the object and the three-dimension measurement device (U.S. Pat. No. 6,970,802).

As shown in FIG. 10, for example, a three-dimensional measurement device VD is placed on the floor FL. An object Q is held by a manipulator MP through a jig JG to determine a position and posture of the object Q. The manipulator MP is controlled to change the position and posture of the object Q variously, so that the three-dimensional measurement device measures the entire circumference of the object Q. The manipulator MP can rotate relatively at joints KS1-KS3. In the case where the object Q is, for example, in the process of development or a prototype for mass production in factories, the same measurement is repeated for the objects Q having the same shape. Accordingly, it is necessary to teach a manipulator all positions and postures for the measurement.

Conventionally, in the case of the teaching for a manipulator, an operator moves the manipulator MP by manual operation to determine a position and posture of an object Q for conducting measurement. If the result shows that the measurement is undesirable, the operator operates the manipulator MP again to change the position and posture of the object Q. After repeating this operation, an appropriate position and posture of the object Q is determined after trial and error.

The trial and error method as described above, however, involves lots of time and energy for determining a position and posture of a three-dimensional measurement device.

Suppose, for example, that after conducting measurement under the state as shown by the solid line of FIG. 10, in order to measure a recess portion B of the object Q, it is intended to change the posture of the object Q so that the bottom of the recess portion B faces the front of the three-dimensional measurement device VD. In such a case, suppose that the joint KS1 is rotated to incline the object Q so that the front face of the object Q faces downward and the posture of the object Q is changed, as shown by the chain line in FIG. 10. This allows the bottom of the recess portion B to face the front. However, the posture change causes the position change, so that the recess portion B is out of a measurable area KR of the three-dimensional measurement device VD. Measurement is impossible under such a situation. Accordingly, it is necessary to finely adjust rotation directions and rotation angles of the plural joints KS1-KS4 of the manipulator MP so that the recess portion B faces the front of the three-dimensional measurement device VD and falls within the measurable area KR. Such fine adjustment requires much time.

In order to conduct measurement of the entire surface of an object, measurement is generally necessary at least at five positions. In some cases, measurement is conducted at twenty positions or so. As a surface shape of an object becomes complicated, longer time is required to determine a position and posture for measurement of a portion of the surface shape.

SUMMARY OF THE INVENTION

The present invention is directed to solve the problems pointed out above, and therefore, an object of the present invention is to easily determine relative positions and postures of a three-dimensional measurement device and an object when the three-dimensional measurement device is used to conduct measurement of an object using a manipulator or the like.

A method according to one aspect of the present invention is a three-dimensional measurement method for conducting measurement of a surface shape of an object using a three-dimensional measurement device. The method includes fixing any one of the three-dimensional measurement device and the object, supporting the other at a support point so that a position and a support posture of the other can be changed, conducting n-th measurement of the surface shape of the object using the three-dimensional measurement device when the support point is set to a first position and the three-dimensional measurement device or the object is in a first support posture, changing the position and a posture so that the support point is set to a second position and the three-dimensional measurement device or the object is in a second support posture, and conducting (n+1)-th measurement of the surface shape of the object using the three-dimensional measurement device. The second position is a position where the support point is changed, about a reference position within a measurable area of the three-dimensional measurement device in the n-th measurement, to an opposite side by a degree equal to a portion corresponding to a change from the first support posture to the second support posture.

A method according to another aspect of the present invention is a method for controlling relative measurement positions and measurement postures of a three-dimensional measurement device and an object when the three-dimensional measurement device is used to conduct measurement of a surface shape of the object sequentially. The method includes fixing any one of the three-dimensional measurement device and the object, supporting the other at a support point with a manipulator, and driving the manipulator between first measurement and second measurement, the first measurement being conducted by the three-dimensional measurement device when the support point is set to a first position and the three-dimensional measurement device or the object is in a first measurement posture, and the second measurement being conducted by the three-dimensional measurement device when the support point is set to a second position and the three-dimensional measurement device or the object is in a second measurement posture. The second position is a position where the support point is changed, about a reference position within a measurable area of the three-dimensional measurement device in the first measurement, to an opposite side by a degree equal to a portion corresponding to a change from the first measurement posture to the second measurement posture.

A method according to yet another aspect of the present invention is a method for controlling a manipulator supporting any one of a three-dimensional measurement device and an object at a support point when the three-dimensional measurement device is used to conduct measurement of a surface shape of the object sequentially. The method includes conducting first measurement in which the support point is set to a first position P and is at a first posture angle A, and conducting second measurement in which the support point is set to a second position P' and is at a second posture angle A'. The manipulator is controlled so as to satisfy the following equation $$P'=R(dA)*(P-Cf)+Cf$$

where dA is a displacement angle from the first posture angle A to the second posture angle A', R(dA) is a matrix representing rotation derived from the displacement angle dA and Cf is a reference position of a measurable area of the three-dimensional measurement device in the first measurement.

These and other characteristics and objects of the present invention will become more apparent by the following descriptions of preferred embodiments with reference to drawings.

DESCRIPTION OF THE PREFERRED EMBODIMENTS

First Embodiment

Figure 1:
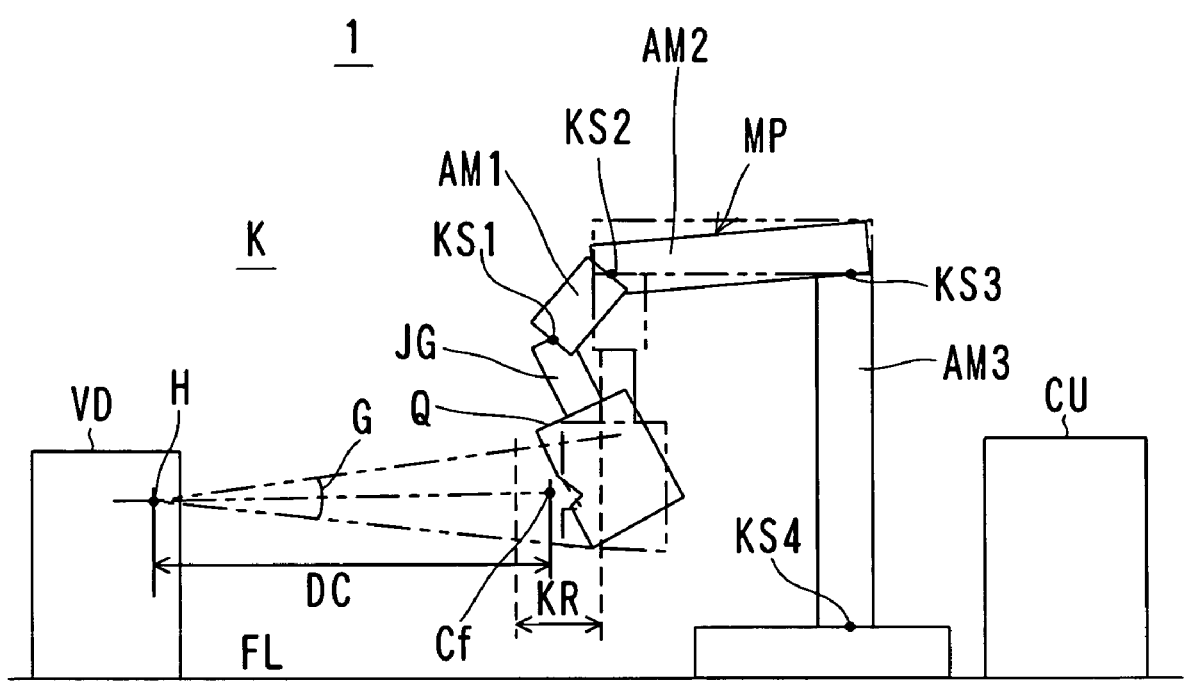
FIG. 1 is a diagram showing a three-dimensional measurement system according to a first embodiment of the present invention.
Figure 2:
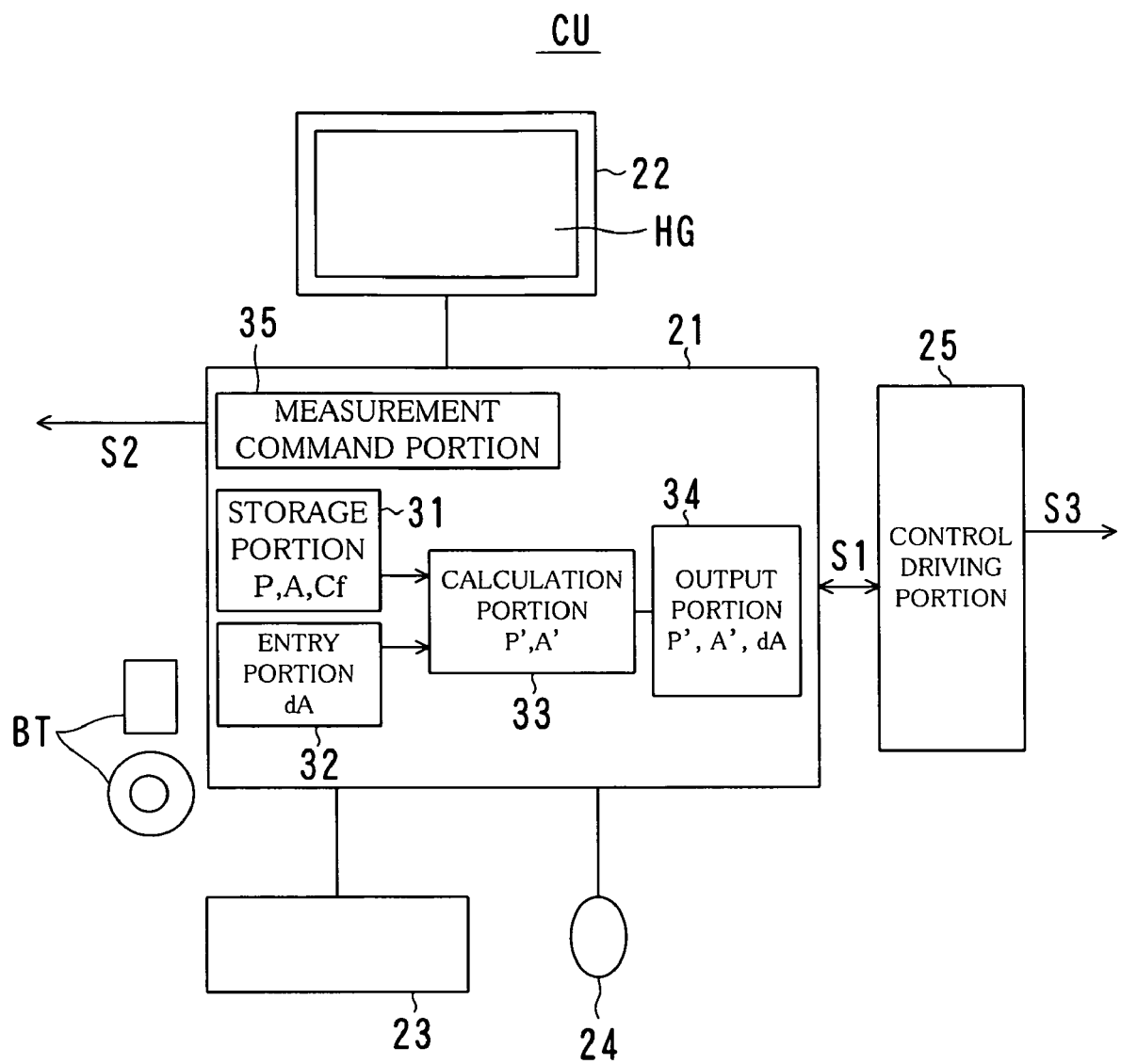
FIG. 2 is a diagram showing an example of a configuration of a control unit.
Figure 3:
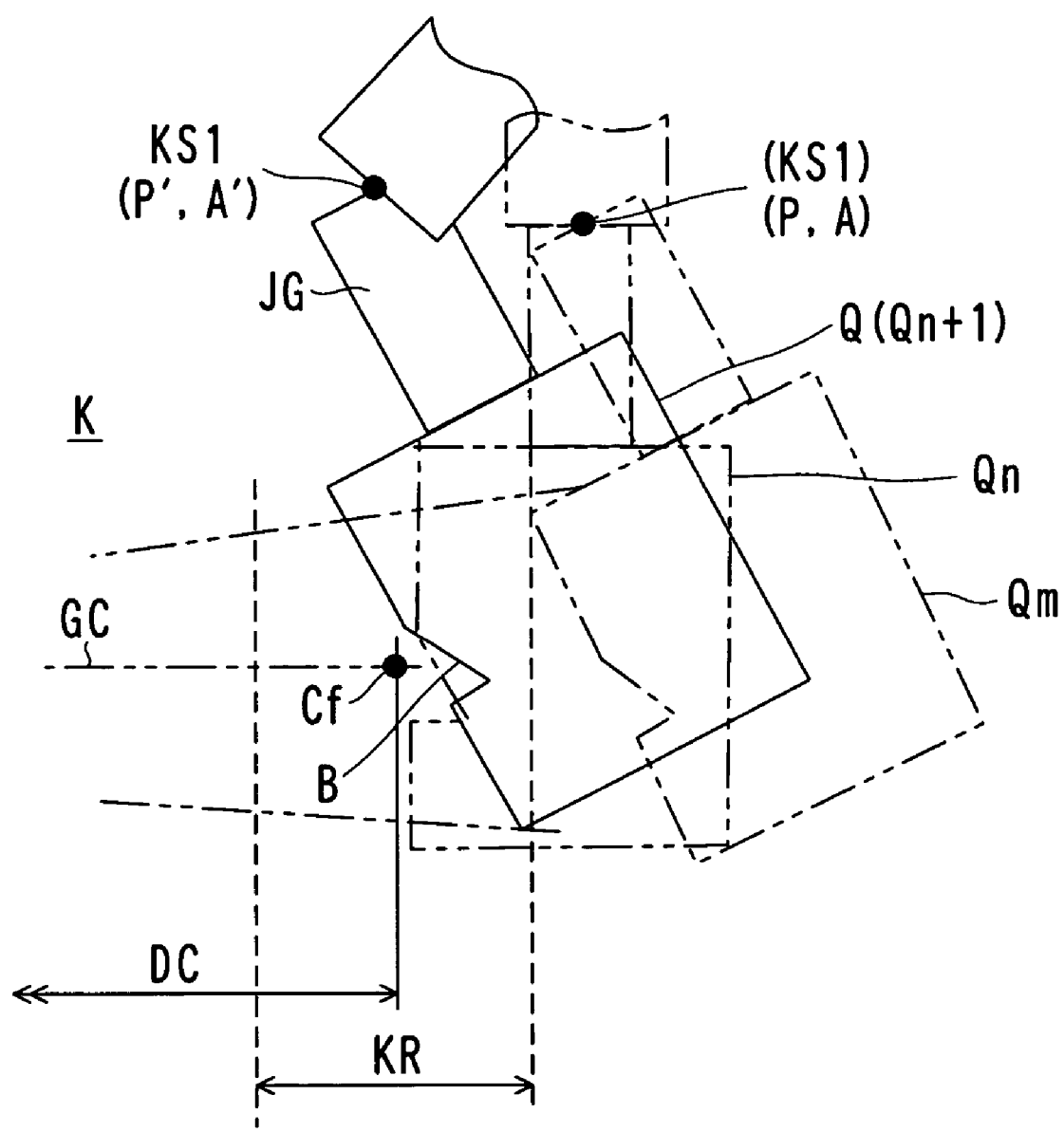
FIG. 3 shows a state in which a manipulator controls a position and posture of an object.
Figure 4:
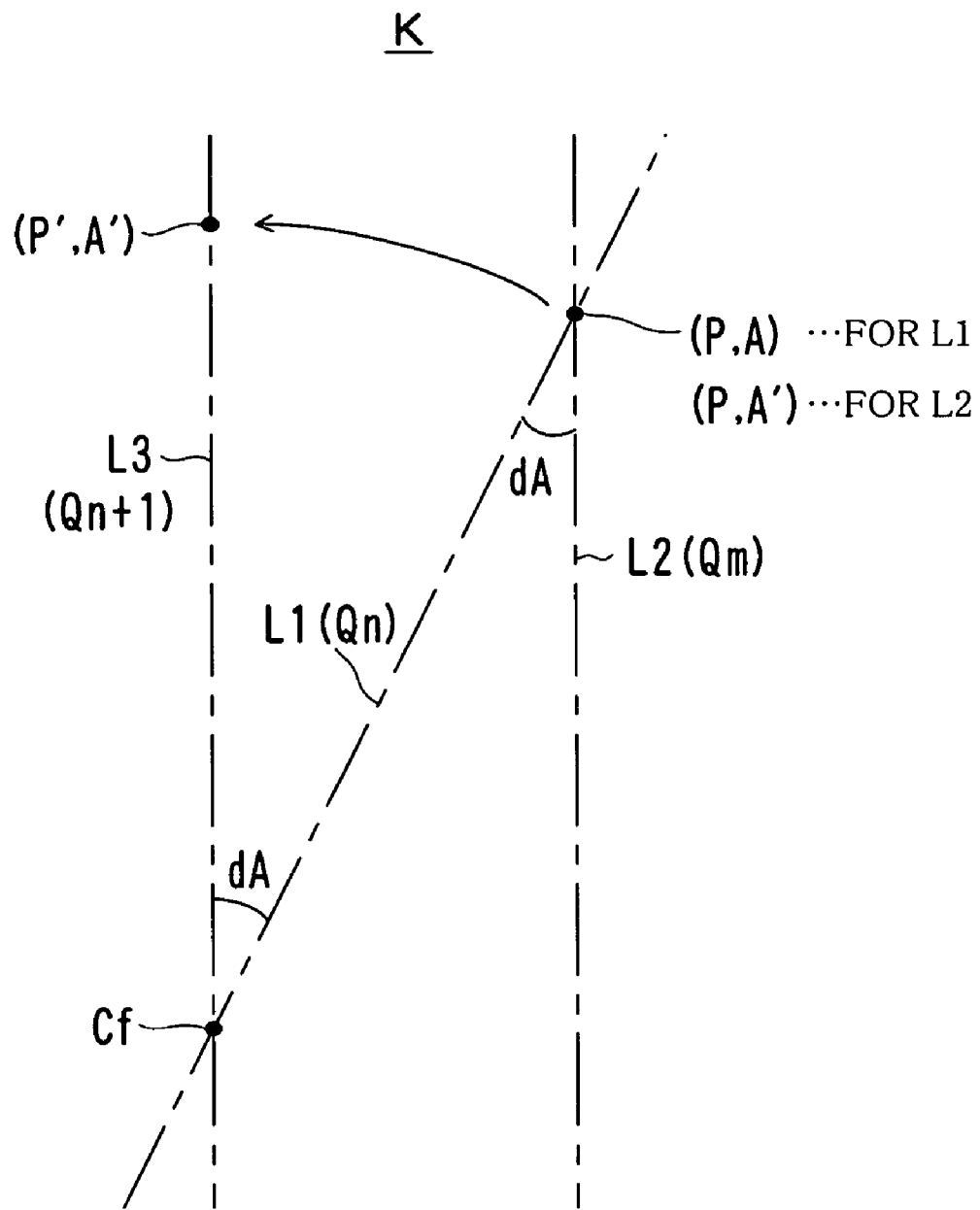
FIG. 4 is a diagram for explaining a method for controlling a position and posture of an object using a manipulator.

FIG. 1 is a diagram showing a three-dimensional measurement system 1 according to a first embodiment of the present invention, FIG. 2 is a diagram showing an example of a configuration of a control unit CU, FIG. 3 shows a state in which a manipulator MP controls a position and posture of an object Q in the three-dimensional measurement system 1, and FIG. 4 is a diagram for explaining a method for controlling a position and posture of the object Q using the manipulator MP.

Referring to FIG. 1, the three-dimensional measurement system 1 includes a three-dimensional measurement device VD, the manipulator MP and the control unit CU. The three-dimensional measurement device VD is placed on the floor FL. The object Q is held by the manipulator MP through a jig JG. A position and posture (measurement posture, support posture or posture angle) of the object Q is changed to conduct measurement of the entire peripheral shape of the object Q.

The three-dimensional measurement device VD conducts measurement of a three-dimensional shape of an object using the light-section method responsive to a command signal S2 output from the control unit CU or operator's operation. The three-dimensional measurement device VD can conduct measurement of a surface shape of an object Q that is within a range of a viewing angle G and within a range of a measurable area KR. Accordingly, it is necessary to determine a position and posture of the object Q by controlling the manipulator MP so that a surface of a part of the object Q to be measured is included within those ranges. Note that the viewing angle G is determined mainly by a deflection range of slit light (detection light) for measurement and a light-receiving area of an imaging element such as a CCD. The measurable area KR is determined by a travel distance of the slit light, a focusing range or a depth of field of a lens optical system.

A reference position Cf is defined within the range of the measurable area KR. In the present embodiment, the reference position Cf shall be defined as a position that is the central position of the measurable area KR and is on the central axis line GC of the viewing angle G. Accordingly, the reference position Cf is indicated by a distance DC from the central position (the origin) H of an optical system of the three-dimensional measurement device VD to the reference position Cf along the axis line (the line-of-sight direction) GC.

A three-dimensional image (three-dimensional shape data) of each part of the object Q measured by the three-dimensional measurement device VD is sent to the control unit CU through an appropriate interface or recording medium. The three-dimensional images are converted into predetermined coordinate systems by the control unit CU based on information on a position and posture of the manipulator MP or the like and are combined together. Note that such processing of the three-dimensional images may be performed by a processing device or a computer other than the control unit CU, or may be performed by the three-dimensional measurement device VD itself.

The manipulator MP is a robot having multijoint arms. In the illustrated example of FIG. 1, the manipulator MP has three arms AM1-AM3 and four joints KS1-KS4. The manipulator MP can turn in the three-dimensional direction at each of the joints KS1-KS4. An end of the arm AM1 is provided with a flange for fixing through, for example, the joint KS1. The jig JG is fixed to the flange by a bolt or the like. The joint KS1 corresponds to a support point according to the present invention.

The manipulator MP changes a position and posture of the object Q, so that the object Q is positioned. A position of the object Q is defined by a position P (x, y, z) of the joint KS1 and a posture of the object Q is defined by A (θx, θy, θz). More specifically, the position P is represented by position coordinates (x, y, z) of the joint KS1 in an appropriate three-dimensional space K in the three-dimensional measurement system 1. The posture A is represented by angles (θx, θy, θz) of the reference axis of the object Q in the three-dimensional space K. Herein, the posture A is sometimes referred to as a "posture angle A" or a "support posture A". In the case where the position P or the posture A is changed, a portion corresponding to the change is represented by a displacement position dP or a displacement angle dA.

Note that various types of known manipulators, robots or others can be used as the manipulator MP. The number of joints KS and arms AM is not limited to the example described above.

The control unit CU serves to control the manipulator MP using control commands to change a position of the joint KS1 that is the support point and a support posture of the object Q by the joint KS1. More specifically, the control unit CU completely controls respective turn angles of the joints KS1-KS4. Thereby, the control unit CU turns the jig JG and the arms AM1-AM3 to control the position P and the posture A of the object Q arbitrarily.

At the time of such control, first measurement is conducted where the joint KS1 is set to a first position P1 and a first support posture A1. Then, second measurement is conducted where the joint KS1 is set to a second position P2 and a second support posture A2. The control unit CU controls, between the first measurement and the second measurement, the manipulator MP so that the second position P2 becomes a position where the posture of the object Q is changed, about the reference position Cf of the three-dimensional measurement device VD, to the opposite side by the same degree as the change from the first support posture A1 to the second support posture A2.

Stated differently, the manipulator MP is controlled, between the first measurement and the second measurement, in a manner to satisfy the relationship shown by the following equation (1). The first measurement is conducted with the joint KS1 being set to the first position P and the first posture angle A. The second measurement is conducted with the joint KS1 being set to a second position P' and a second posture angle A'.

$$P'=R(dA)*(P-Cf)+Cf \qquad (1)$$

where dA is a displacement angle from the first posture angle A to the second posture angle A', R(dA) is a matrix representing rotation derived from the displacement angle dA and Cf is the reference position within a measurable area of the three-dimensional measurement device in the first measurement.

As shown in FIG. 2, the control unit CU includes a processing device 21, a display device 22, a keyboard 23, a mouse 24 and a control driving portion 25.

The processing device 21 includes a CPU, a ROM, a RAM, a peripheral circuit, a magnetic storage device, a media drive device and various interfaces such as RS-232C and USB. The CPU executes appropriate processing programs stored in the ROM or the RAM to form a storage portion 31, an entry portion 32, a calculation portion 33, an output portion 34, a measurement command portion 35 and others.

The storage portion 31 stores a position (a first position) P, a posture angle (a first posture angle) A and a reference position Cf. The position P and the posture angle A are for the previous measurement (or n-th measurement). While the position P and the posture angle A are entered from the control driving portion 25 via the interface, they may be ones determined last time by calculation. The reference position Cf is obtained from specifications information of the three-dimensional measurement device VD that is entered in the processing device 21 via an input device such as the keyboard 23 or the mouse 24, a recording medium BT such as a CD-ROM or a memory chip, an appropriate interface or an appropriate communications line. It is also possible to enter only the reference position Cf separately and to store the same.

The entry portion 32 stores a displacement angle dA that an operator enters by operating the input device. The entry portion 32 may be adapted to perform processing for displaying a picture that invites the operator to enter a displacement angle dA on a display screen HG of the display device 22, so that data entered on the picture may be obtained and stored as the displacement angle dA. Alternatively, the operator may operate the manipulator MP manually to enter a displacement angle dA by changing only the posture of the object Q. Instead of entering a displacement angle dA, a posture angle A' in this measurement may be directly entered. In the case where a posture angle A' in this measurement (or (n+1)-th measurement) is entered, a displacement angle dA can be determined by the following equation (2).

$$dA=A'-A \qquad (2)$$

The calculation portion 33 calculates a position P' that is the target this time by using the equation (1) described earlier based on the displacement angle dA, the position P and the reference position Cf.

The output portion 34 outputs, as a signal S1, the entered posture angle A' or displacement angle dA and the calculated position P' to the control driving portion 25 via an appropriate interface.

The measurement command portion 35 outputs a signal S2 for instructing the three-dimensional measurement device VD to conduct measurement based on the signal S1 entered from the control driving portion 25, a command entered from the input device and others.

The display device 22 can display, on the display screen HG, the picture for inviting an operator to enter a displacement angle dA as described above, a picture for indicating specifications of the three-dimensional measurement device VD, a picture for indicating details of data taught to the manipulator MP, three-dimensional images obtained by measurement with the three-dimensional measurement device VD, a three-dimensional image obtained by combining the three-dimensional images and other pictures and images.

The input devices such as the keyboard 23 and the mouse 24 serve to enter various commands and data by operator's operation.

The control driving portion 25 drives and controls the manipulator MP under numerical control depending on operator's operation, details taught by an operator or a signal S1 outputted from the processing device 21, or a signal S1 outputted from the processing device 21. The control driving portion 25 inputs, as a signal S1, a position P and a posture A changing in line with motion of the manipulator MP in the processing device 21.

A personal computer can be used as the processing device 21 or the display device 22. A program for achieving the storage portion 31, the entry portion 32, the calculation portion 33, the output portion 34, the measurement command portion 35 and others in the processing device 21 can be installed through an appropriate recording medium BT via an appropriate interface or an appropriate communications line.

A description is provided, with reference to FIGS. 3 and 4, of control of the manipulator MP using the control unit CU.

FIG. 3 is an enlarged view of the object Q shown in FIG. 1 and its vicinities. In FIG. 3, an object Qn shown by a chain line is an object in the previous measurement. An object Qm shown by another chain line is a hypothetical object obtained by changing a posture A of the object Qn by a displacement angle dA. The object Q shown by a solid line is an object in this measurement.

Figure 10:
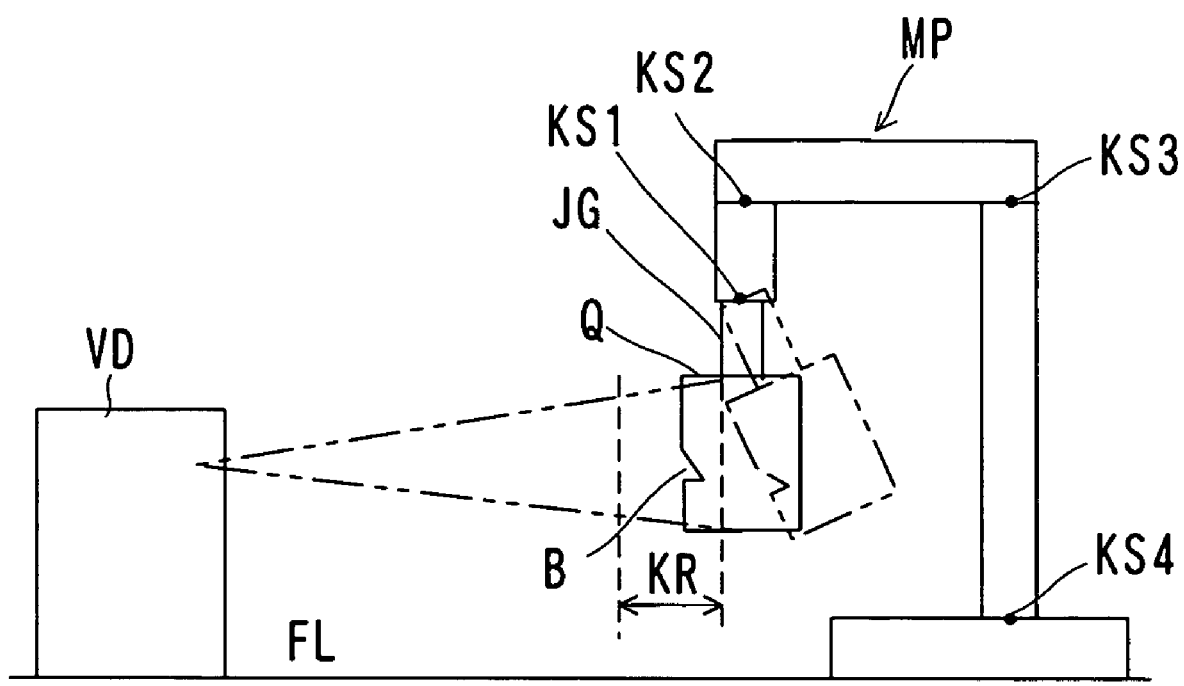
FIG. 10 is a diagram showing an example of three-dimensional measurement in a conventional case.

Referring to FIG. 3, the object Qn shows a position P and a posture A in the case where measurement is properly conducted in the previous measurement. As described earlier with reference to FIG. 10, however, the recess portion B cannot be measured accurately by the previous measurement under the position P and the posture A of the object Qn. Accordingly, it is intended to change the posture of the object Q so that the bottom of the recess portion B faces the front of the three-dimensional measurement device VD for conducting measurement this time. An operator designates a displacement angle dA and a posture A' for this measurement with respect to the previous posture A. This designation may be performed by entry using the input device of the control unit CU. Alternatively, the operator may operate the manipulator MP to incline the object Q to take an appropriate posture and designate the status for entry. A state in which only the posture A is changed to the posture A' is shown as the object Qm.

Under this state, the control unit CU calculates a position P' for this measurement.

As shown in FIG. 4, a line L1 is assumed which connects a position P and a reference position Cf and the line L1 is viewed as the reference axis of the object Qn taking the posture A. The reference axis of the hypothetical object Qm taking the posture A' after changing the posture, with respect to the posture A, only by the displacement angle dA is a line L2 shown in FIG. 4.

The position P on the line L1 is rotated about the reference position Cf by the same degree as the displacement angle dA on the opposite side and a position after the rotation is defined as a position P'. The position is the position P' to be determined this time. Stated differently, a line L3 obtained by rotating the line L1 about the reference position Cf by the same degree as the displacement angle dA on the opposite side is the reference axis of the object Qn+1 this time. The position P and the position P' are located at the same distance from the reference position Cf. As can be seen from FIG. 4, the line L3 and the line L2 are parallel to each other.

In this way, the position P' and the posture A' of the object Qn+1 this time or (n+1)-th time can be determined from the position P and the posture A of the object Qn for the last time or n-th time.

As shown in FIG. 3, under the position P' and the posture A' this time, the bottom of the recess portion B faces the front of the three-dimensional measurement device VD and the recess portion B is included within a measurable area KR and is located at a position that is substantially the same as the position in the previous measurement. If measurement is conducted accurately or clearly at the previous position P and posture A, measurement can be conducted accurately or clearly at the position P' and the posture A' this time as in the previous measurement.

Accordingly, the position P and the posture A are adjusted in the n-th measurement (the first measurement). Then, the (n+1)-th measurement (the second measurement) is conducted under the position P' and the posture A' that are determined as described above. These processes are repeated, allowing each part of the object Q to be measured sequentially. More specifically, an operator determines an appropriate position P and posture A of the object Q at the time of the initial measurement. After that, the operator designates a displacement angle dA or a posture A' so that a part of the object Q to be measured faces toward the three-dimensional measurement device VD. Thereby, a suitable position P' is automatically determined by the processing device 21 and the manipulator MP is controlled in line with the determination. Note that "n" is an appropriate integer.

Thus, when the three-dimensional measurement device is used to conduct measurement of an object using a manipulator or the like, it is possible to easily determine relative positions and postures of the three-dimensional measurement device and the object.

Such control using the control unit CU is described in line with the equation (1) described above. A vector (P—Cf) from the reference position Cf toward the position P is multiplied by a matrix R(dA) representing rotation derived from a displacement angle dA and is rotated. The resultant is added to the reference position Cf, which gives the position P'. The vector (P—Cf) corresponds to the line L1 and the resultant after rotation of the line L1 corresponds to the line L3. Addition of the reference position Cf corresponds to return of the vector to the three-dimensional space K.

Herein, as described earlier, the positions P and P', the postures A and A' and the displacement angle dA and others are arbitrarily defined in the three-dimensional space K. Accordingly, they are applicable to the entire surface of the object Q in the three-dimensional space K.

Second Embodiment

In the first embodiment described above, measurement is conducted by holding an object Q with a manipulator MP and changing a position P and a posture A of the object Q. The first embodiment is suitable for a case where the object Q is relatively small and a case where the position or posture of the object Q can be changed. In contrast, in the case where the object Q is relatively large, and in the case where the position or posture of the object Q cannot be changed, it is preferable that the object Q be set on the floor or on an appropriate table and a three-dimensional measurement device VD be held and moved by the manipulator MP. Such cases are described in this second embodiment.

Figure 5:
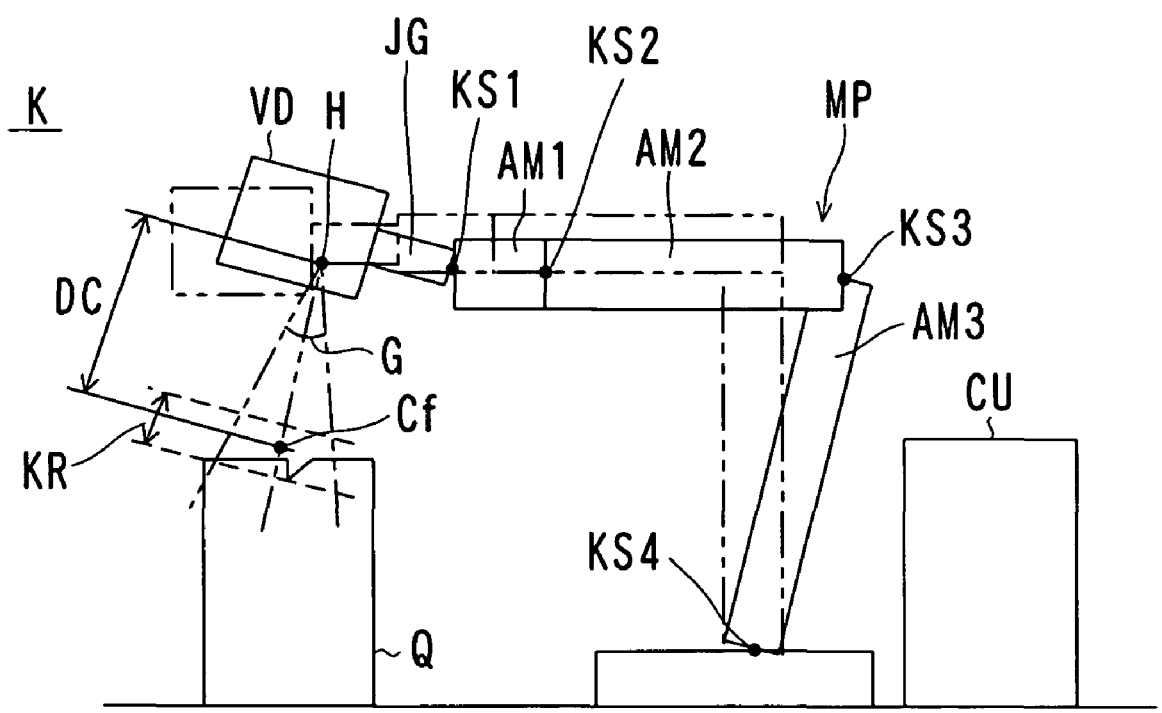
FIG. 5 is a diagram showing a three-dimensional measurement system according to a second embodiment of the present invention.
Figure 6:
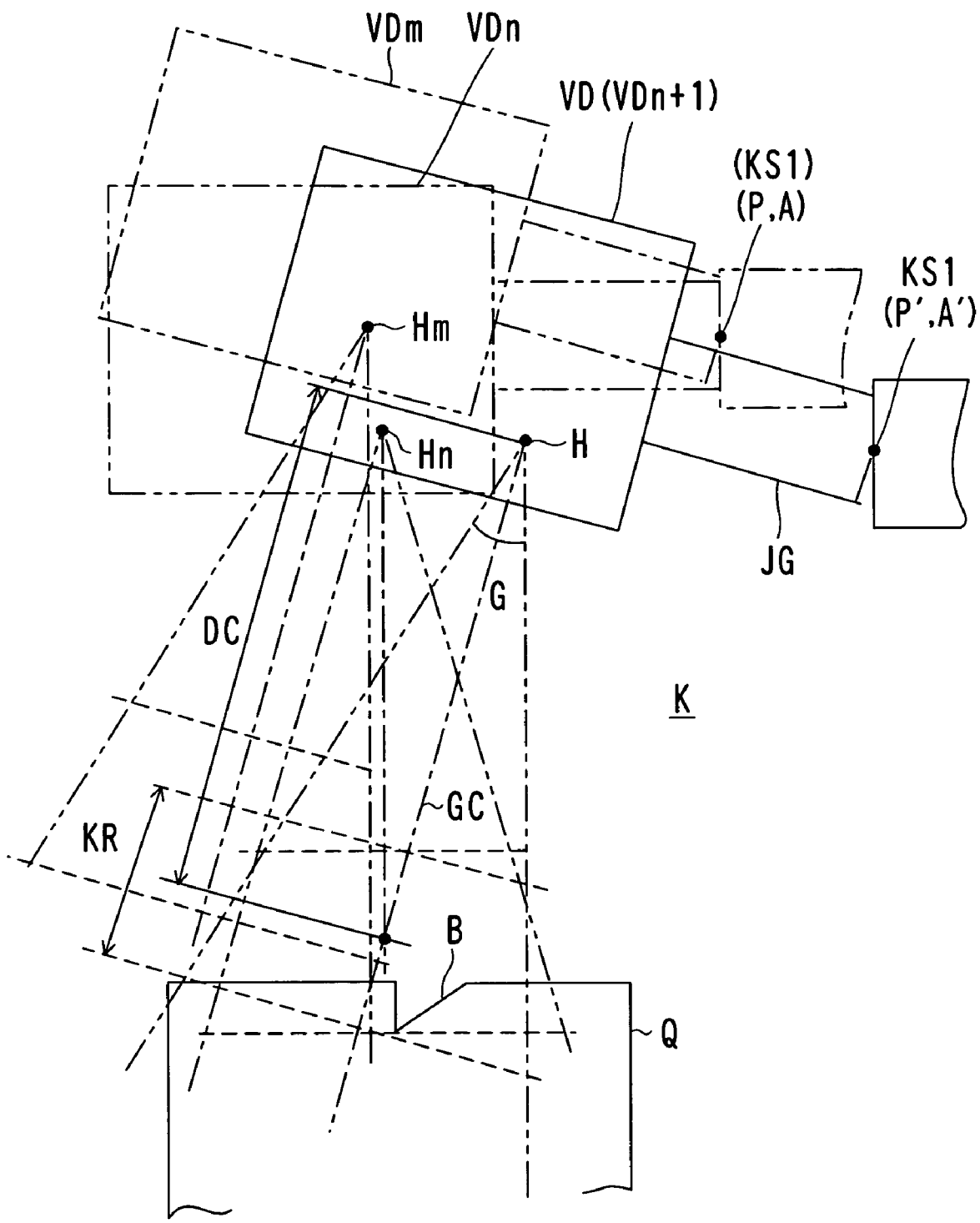
FIG. 6 shows a control state of a position and posture of a three-dimensional measurement device.
Figure 7:
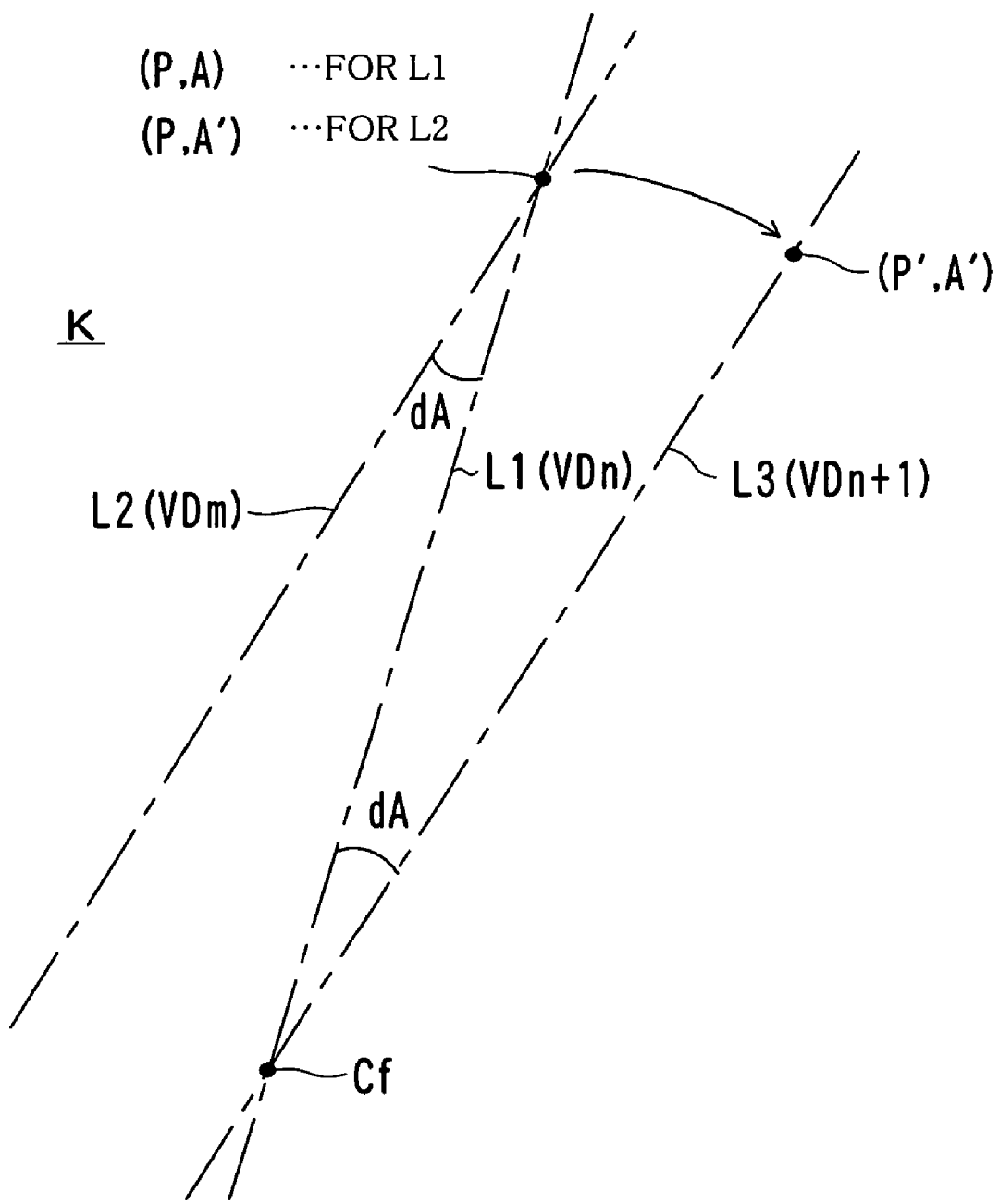
FIG. 7 is a diagram for explaining a method for controlling a position and posture of a three-dimensional measurement device.

FIG. 5 is a diagram showing a three-dimensional measurement system 1B according to the second embodiment of the present invention, FIG. 6 shows a control state of a position and posture of the three-dimensional measurement device VD using the manipulator MP in the three-dimensional measurement system 1B, FIG. 7 is a diagram for explaining a method for controlling a position and posture of the three-dimensional measurement device VD using the manipulator MP. In these drawings, elements having the same functions as those in the first embodiment are given the same reference numerals/symbols and descriptions are simplified or omitted.

Referring to FIG. 5, the three-dimensional measurement system 1B includes the three-dimensional measurement device VD, the manipulator MP and the control unit CU. The object Q is set on the floor FL and the three-dimensional measurement device VD is held by the manipulator MP through a jig JG. The entire peripheral shape of the object Q is measured by changing the position and posture of the three-dimensional measurement device VD.

The three-dimensional measurement device VD can conduct measurement of a surface shape of the object Q that is within a range of a viewing angle G and within a range of a measurable area KR. Since the three-dimensional measurement device VD is moved, the position of the measurable area KR, the central position H of an optical system, an axis line GC, a reference position Cf and others are changed depending on the movement of the three-dimensional measurement device VD. The position of the three-dimensional measurement device VD is defined by a position P (x, y, z) of a joint KS1 and the posture of the three-dimensional measurement device VD is defined by A (θx, θy, θz).

FIG. 6 is an enlarged view of the three-dimensional measurement device VD shown in FIG. 5 and its vicinities. In FIG. 6, a three-dimensional measurement device VDn shown by a chain line is the three-dimensional measurement device VD in the previous measurement. A three-dimensional measurement device VDm shown by another chain line is a hypothetical position derived by changing the posture A of the three-dimensional measurement device VDn by a displacement angle dA. The three-dimensional measurement device VD shown by a solid line is a position in this measurement.

Referring to FIG. 6, the three-dimensional measurement device VDn shows a position P and a posture A in the case where measurement is properly conducted in the previous measurement. However, the recess portion B cannot be measured accurately by the previous measurement under the position P and the posture A of the three-dimensional measurement device VDn. Accordingly, it is intended to change the posture of the three-dimensional measurement device VD so that the bottom of the recess portion B faces the front of the three-dimensional measurement device VD for conducting measurement this time. An operator designates a displacement angle dA or a posture A' for this measurement with respect to the previous posture A. A state in which only the posture A is changed to the posture A' is shown as the three-dimensional measurement device VDm.

Under this state, the control unit CU calculates a position P' for this measurement.

As shown in FIG. 7, a line L1 is assumed which connects a position P and a reference position Cf and the line L1 is viewed as the reference axis of the three-dimensional measurement device VDn taking a posture A. The reference axis of the hypothetical three-dimensional measurement device VDm taking the posture A' after changing the posture, with respect to the posture A, only by the displacement angle dA is a line L2 shown in FIG. 7.

The position P on the line L1 is rotated about the reference position Cf by the same degree as the displacement angle dA on the opposite side and a position after the rotation is defined as a position P'. The position is the position P' to be determined this time. Stated differently, a line L3 obtained by rotating the line L1 about the reference position Cf by the same degree as the displacement angle dA on the opposite side is the reference axis of the three-dimensional measurement device VDn+1 this time. The position P and the position P' are located at the same distance from the reference position Cf. As can be seen from FIG. 7, the line L3 and the line L2 are parallel to each other.

In this way, the position P' and the posture A' of the three-dimensional measurement device VDn+1 this time or (n+1)-th time can be determined from the position P and the posture A of the three-dimensional measurement device VDn for the last time or n-th time.

As shown in FIG. 6, under the position P' and the posture A' this time, the three-dimensional measurement device VD faces the front of the bottom of the recess portion B and the recess portion B is included within a measurable area KR and is located at a position that is substantially the same as the position in the previous measurement. If measurement is conducted accurately or clearly at the previous position P and posture A, measurement can be conducted accurately or clearly at the position P' and the posture A' this time as in the previous measurement.

Accordingly, the position P and the posture A are adjusted in n-th measurement (first measurement). Then, (n+1)-th measurement (second measurement) is conducted under the position P' and the posture A' that are determined as described above. These processes are repeated, allowing each part of the object Q to be measured sequentially. More specifically, an operator determines an appropriate position P and posture A of the three-dimensional measurement device VD at the time of the initial measurement. After that, the operator designates a displacement angle dA or a posture A' so that the three-dimensional measurement device VD faces a part of the object Q to be measured. Thereby, a suitable position P' is automatically determined by the processing device 21 and the manipulator MP is controlled in line with the determination.

The following is a description of a control processing flow in the three-dimensional measurement system 1 or 1B with reference to flowcharts.

Figure 8:
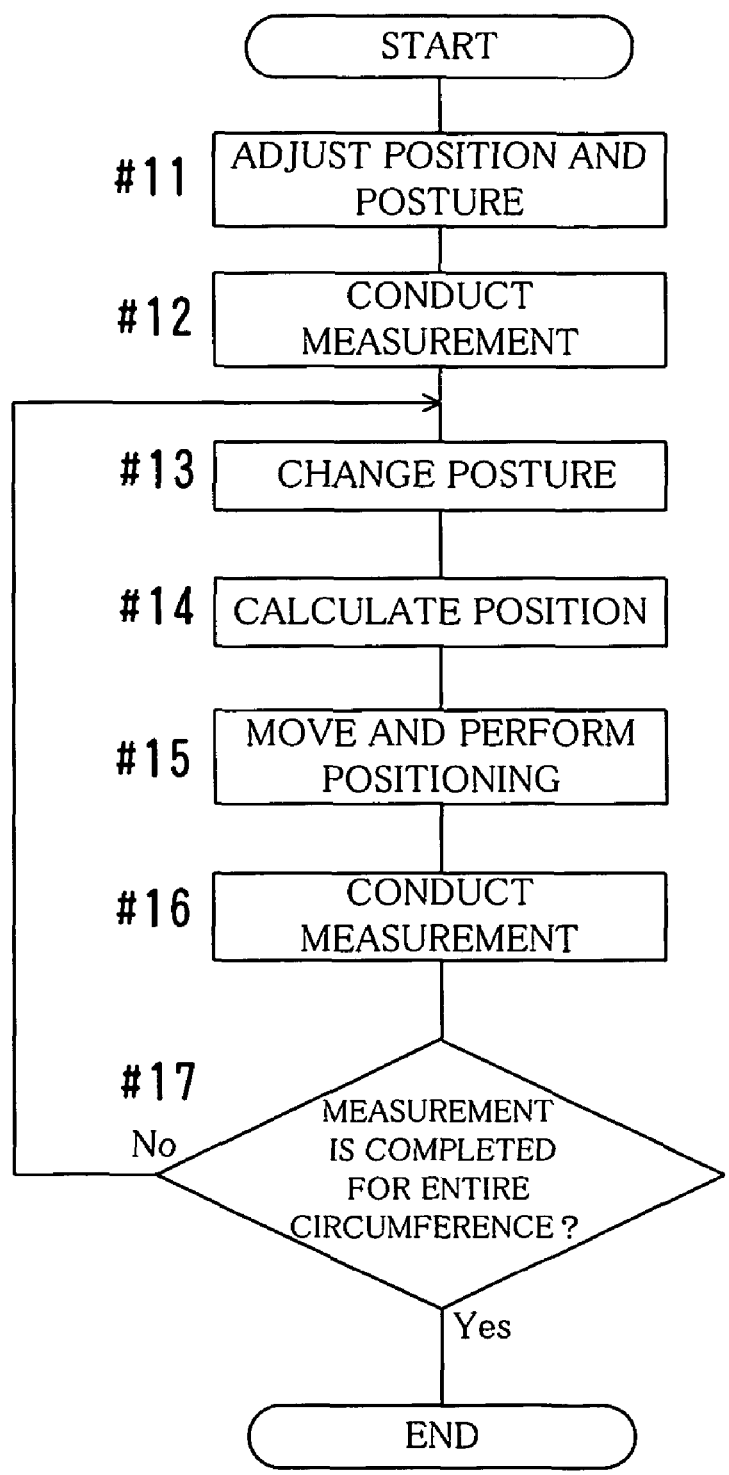
FIG. 8 is a flowchart showing a control processing flow in the three-dimensional measurement system.
Figure 9:
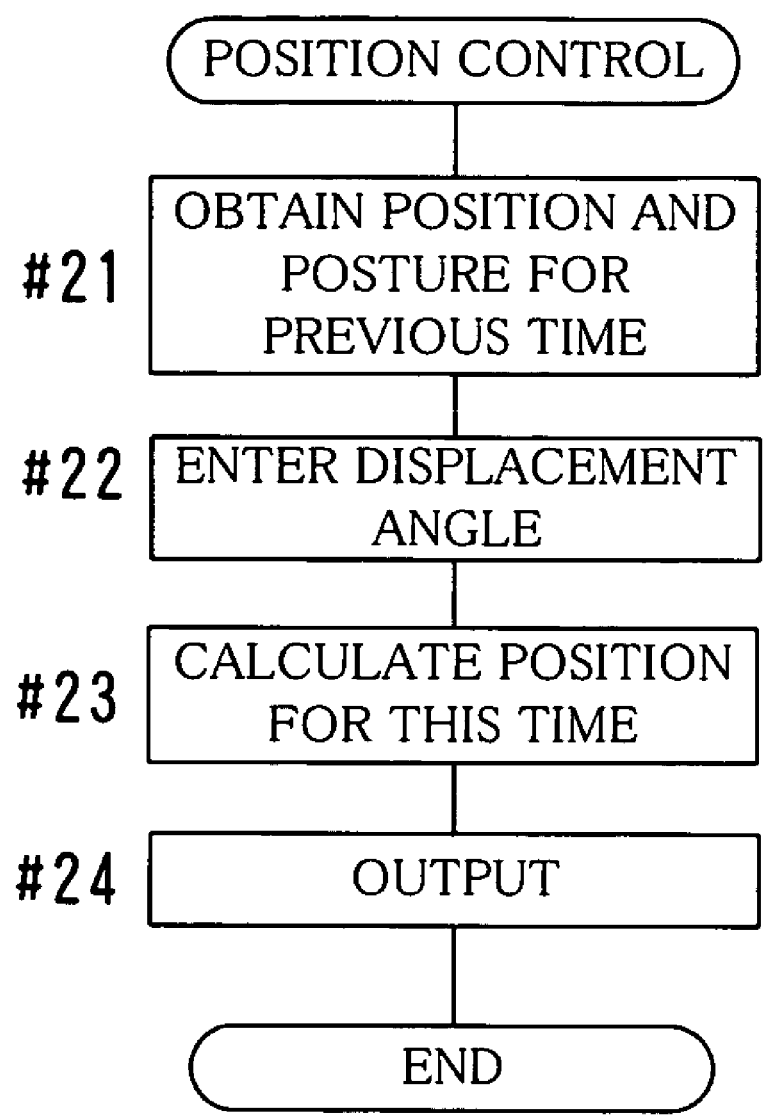
FIG. 9 is a flowchart showing a processing flow in a processing device.

FIG. 8 is a flowchart showing a control processing flow in the three-dimensional measurement system 1 or 1B, and FIG. 9 is a flowchart showing a processing flow in the processing device 21.

Referring to FIG. 8, a position P and a posture A are adjusted for the first measurement (#11) and measurement is conducted (#12) with the manipulator MP holding the object Q or the three-dimensional measurement device VD. On this occasion, data for the position P and the posture A are stored in the control unit CU and used for later processing. Further, the data are used as teaching data, retrieved and reproduced later, which allows positioning with the manipulator MP and measurement in a fully automatic way.

The posture A is changed for the second measurement (#13). Thereby, a new posture A' is set or a displacement angle dA is designated. In the processing device 21, a position P' for the second measurement is calculated (#14). Based on the calculation result, the manipulator MP is driven and positioning is performed (#15) and measurement is conducted (#16). The processing from Step #13 through Step #16 is repeated. When the entire circumference of the object Q is measured (Yes in #17), the processing is completed.

Referring to FIG. 9, a position A and a posture A for the previous measurement are obtained (#21). A displacement angle dA or a posture A' for this measurement are entered (#22). A position P' this time is calculated (#23) and the calculation result and others are outputted (#24).

In the first and second embodiments described above, the configuration, the details of processing, the processing order, the processing timing of the processing device 21 and the structure of the pictures can be variously modified. In the case where the entire circumference of the object Q is measured, it is possible to appropriately adjust the posture A and the position P by manual operation during the processing, instead of the adjustment only the first time. More specifically, a configuration is possible in which the entire circumference of the object Q is divided into plural parts for measurement and the respective three-dimensional image groups are later combined together. For example, the manipulator MP may rehold the object Q or the three-dimensional measurement device VD. The position or posture of the object Q or the manipulator MP set on the floor FL may be changed during the processing. Three-dimensional measurement is not necessarily conducted for the entire circumference of the object Q.

The overall configuration of the three-dimensional measurement device DV, the manipulator MP, the control unit CU, the three-dimensional measurement system 1 or 1B, the configurations of various portions thereof, the shape, the size, the format, the type, the number, the material and the positional relationship thereof, and the make may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for controlling relative measurement positions and measurement postures of a three-dimensional measurement device and an object when the three-dimensional measurement device is used to conduct a measurement of a surface shape of the object sequentially, the method comprising:
    fixing one of the three-dimensional measurement device or the object;
    supporting a non-fixed one of the three-dimensional measurement device or the object at a support point with a manipulator; and
    driving the manipulator between a first measurement and a second measurement, the first measurement being conducted by the three-dimensional measurement device when the support point is set to a first position and the three-dimensional measurement device or the object is in a first measurement posture, and the second measurement being conducted by the three-dimensional measurement device when the support point is set to a second position and the three-dimensional measurement device or the object is in a second measurement posture,
    wherein the second position is a position where the support point is changed, about a reference position within a measurable area of the three-dimensional measurement device in the first measurement, to an opposite side by a degree equal to a portion corresponding to a change from the first measurement posture to the second measurement posture.

2. A method for controlling a manipulator supporting one of a three-dimensional measurement device or an object at a support point when the three-dimensional measurement device is used to conduct a measurement of a surface shape of the object sequentially, the method comprising:
    driving the manipulator between a first measurement in which the support point is set to a first position and is in a first measurement posture and a second measurement in which the support point is set to a second position and is in a second measurement posture; and
    when driving the manipulator, controlling the manipulator so that the second position is a position where the support point is changed, about a reference position within a measurable area of the three-dimensional measurement device in the first measurement, to an opposite side by a degree equal to a portion corresponding to a change from the first measurement posture to the second measurement posture.

3. A method for controlling a manipulator supporting one of a three-dimensional measurement device or an object at a support point when the three-dimensional measurement device is used to conduct a measurement of a surface shape of the object sequentially, the method comprising:
    conducting a first measurement in which the support point is set to a first position P and is at a first posture angle A; and
    conducting a second measurement in which the support point is set to a second position P' and is at a second posture angle A',
    wherein the manipulator is controlled so as to satisfy the following equation $$P'=R(dA)*(P-Cf)+Cf$$

where dA is a displacement angle from the first posture angle A to the second posture angle A', R(dA) is a matrix representing a rotation derived from the displacement angle dA and Cf is a reference position of a measurable area of the three-dimensional measurement device in the first measurement.

4. A three-dimensional measurement system for conducting a three-dimensional measurement of a surface shape of an object, the system comprising:
    a three-dimensional measurement device;
    a manipulator for supporting one of the three-dimensional measurement device or the object at a support point; and
    a control device for controlling the manipulator to change a position and a support posture of the support point,
    wherein the control device controls the manipulator between a first measurement in which the support point is set to a first position and is in a first support posture and a second measurement in which the support point is set to a second position and is in a second support posture, so that the second position is a position where the support point is changed, about a reference position within a measurable area of the three-dimensional measurement device, to an opposite side by a degree equal to a portion corresponding to a change from the first support posture to the second support posture.

5. A three-dimensional measurement system for conducting a measurement of a surface shape of an object sequentially, the system comprising:
    a three-dimensional measurement device;
    a manipulator for supporting one of the three-dimensional measurement device or the object at a support point; and
    a control device for controlling the manipulator to change a position and a support posture angle of the support point,
    wherein the control device controls the manipulator between a first measurement in which the support point is set to a first position P and is at a first support posture angle A and a second measurement in which the support point is set to a second position P' and is at a second support posture angle A', so as to satisfy the following equation $$P'=R(dA)*(P-Cf)+Cf$$

where dA is a displacement angle from the first support posture angle A to the second support posture angle A', R(dA) is a matrix representing a rotation derived from the displacement angle dA and Cf is a reference position within a measurable area of the three-dimensional measurement device in the first measurement.

6. A device for controlling a manipulator supporting one of a three-dimensional measurement device or an object at a support point when the three-dimensional measurement device is used to conduct a measurement of a surface shape of the object sequentially, the device comprising:
    an entry portion for entering a posture angle A' for the measurement or a displacement angle dA that is an angle changed from a posture angle for a previous measurement;
    a calculation portion for calculating a position P' of the support point for the measurement based on the following equation $$P'=R(dA)*(P-Cf)+Cf$$

where P is a position of the support point for the previous measurement, R(dA) is a matrix representing a rotation derived from the displacement angle dA and Cf is a reference position within a measurable area of the three-dimensional measurement device in the previous measurement; and an output portion for outputting the posture angle A' or the displacement angle dA, both of which are entered, and the position P' of the support point thus calculated, to drive and control the manipulator.

7. A computer program product for use in a computer that stores a computer program for controlling a manipulator supporting one of a three-dimensional measurement device or an object at a support point when the three-dimensional measurement device is used to conduct a measurement of a surface shape of the object sequentially, the computer program letting the computer perform:

entering a posture angle A' for the measurement or a displacement angle dA that is an angle changed from a posture angle for a previous measurement;

calculating a position P' of the support point for the measurement based on the following equation $$P' = R(dA)*(P-Cf) + Cf$$

where P is a position of the support point for the previous measurement, R(dA) is a matrix representing a rotation derived from the displacement angle dA and Cf is a reference position within a measurable area of the three-dimensional measurement device in the previous measurement; and outputting the posture angle A' or the displacement angle dA, both of which are entered, and the position P' of the support point thus calculated.

8. A three-dimensional measurement system for conducting a three-dimensional measurement of a surface shape of an object, the system comprising:

a three-dimensional measurement device;

a manipulator for supporting one of the three-dimensional measurement device or the object at a support point; and a control device for controlling the manipulator to change a position and a support posture of the support point, wherein the control device determines the position and the support posture of the support point to prevent a substantial change of a reference position within a measurable area of the three-dimensional measurement device and changes the position and the support posture of the support point.

* * * * *